(12) United States Patent
Madaiah

(10) Patent No.: US 10,182,117 B2
(45) Date of Patent: Jan. 15, 2019

(54) METHOD AND SYSTEM FOR TRANSMITTING DATA FROM TELEMETRY DEVICES TO ENODEB OVER WIRELESS COMMUNICATION NETWORK

(71) Applicant: TEJAS NETWORKS LIMITED, Bangalore (IN)

(72) Inventor: Vinod Kumar Madaiah, Bangalore (IN)

(73) Assignee: TEJAS NETWORKS LIMITED, Bangalore (IN)

(*) Notice: Subject to any disclaimer, the term of this patent is extended or adjusted under 35 U.S.C. 154(b) by 18 days.

(21) Appl. No.: 15/418,079

(22) Filed: Jan. 27, 2017

(65) Prior Publication Data
US 2017/0223703 A1  Aug. 3, 2017

(30) Foreign Application Priority Data
Jan. 28, 2016  (IN) .............................. 201641003000

(51) Int. Cl.
*H04W 4/00* (2018.01)
*H04L 29/08* (2006.01)

(52) U.S. Cl.
CPC .............. *H04L 67/12* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/22* (2018.01)

(58) Field of Classification Search
CPC ..................................................... H04L 67/12
See application file for complete search history.

(56) References Cited

U.S. PATENT DOCUMENTS

| | | | |
|---|---|---|---|
| 6,823,170 B1* | 11/2004 | Dent | H04B 7/18515 342/368 |
| 9,477,615 B1* | 10/2016 | Basson | G06F 13/20 |
| 2013/0242922 A1* | 9/2013 | Suzuki | H04L 1/1607 370/329 |
| 2016/0073391 A1* | 3/2016 | Awad | H04L 1/1822 370/329 |
| 2016/0087775 A1* | 3/2016 | Hedayat | H04L 1/12 370/329 |
| 2017/0102462 A1* | 4/2017 | Gupta | G01S 19/12 |

* cited by examiner

*Primary Examiner* — Gerald A Smarth
(74) *Attorney, Agent, or Firm* — Oliff PLC

(57) ABSTRACT

Embodiments herein relate to a method, telemetry aggregator and system for transmitting data from a plurality of telemetry devices to an evolved nodeB (eNodeB) over wireless communication network. A telemetry aggregator (TA) is placed in between the telemetry device and the eNodeB. The TA is placed close to the power source. This ensures that even the low power telemetry devices can transmit the data over the mobile network. The TD transmits plurality of data frames to the TA. The TA aggregates and assembles the plurality of data frames into an aggregated data frame. TA then transmits the aggregated data frame to the eNodeB at a preferred time and frequency. Since the plurality of data frames are aggregated, there is no need for the eNodeB to be connected with the Internet of Things (IoT) devices or TD for the processing of the control messages and the data.

12 Claims, 4 Drawing Sheets

METHOD AND SYSTEM FOR TRANSMITTING DATA FROM TELEMETRY DEVICES TO ENODEB OVER WIRELESS COMMUNICATION NETWORK

TECHNICAL FIELD

Embodiments of the present disclosure generally relate to telecommunication, and particularly, but not exclusively to method, telemetry aggregator and system for transmitting data from a plurality of telemetry devices to an evolved nodeB over wireless communication network.

BACKGROUND

Telemetry Devices (TD) are well-known in the art for automatic measurement and wireless transmission of data from remote sources in a communication network. The TDs may communicate the data directly to an Evolved Node B (eNodeB) in the communication network. The eNodeB is the hardware that is connected to the wireless communication network which communicates directly with User Equipment (UEs) like a base transceiver station (BTS).

The TDs are low power devices which have limited power capabilities. The problem with the data transmission from low power telemetry devices are that if low power TDs communicate directly with the eNodeB then such TDs must be close to a power source. If the TDs are far-away from the eNodeB then it leads to quick drain of battery power of the TDs. Also, such TDs have no access to the power source since they usually have non-rechargeable cells or battery.

Another problem is limited processing capability of eNodeBs. The eNodeBs are designed to handle control messages related to radio resource and connection establishment from about 1000 UEs distributed apart. If these UEs are high mobility UEs and if there are on an average 1000 UEs at any time, then eNodeB (eNB) will have no resource to process all control messages and data packets. This processing capability prevents existing or already deployed eNodeB (or BTS or NodeB), in general intermediate network entities, to handle connection or resource requests from additional 10,000 or many Internet of Things (IoT) devices.

Hence, there exists a need for a method to enable low power telemetry devices to transmit telemetry reading/data over a communication network. Also, there is a need to optimize the processing capabilities of the intermediate network entities such as eNodeB.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Accordingly, the present disclosure relates to a telemetry aggregator for transmitting data from a plurality of telemetry devices to an evolved nodeB over wireless communication network, the telemetry aggregator comprising: a receiver to receive a plurality of data frames from one of the plurality of the telemetry devices; a processor coupled to the receiver and configured to: aggregate the plurality of data frames to generate an aggregated data frame; and communicate a preferred time and frequency to the evolved nodeB for transmitting the aggregated data frame to the evolved nodeB; and a transmitter coupled to the processor and configured to transmit the aggregated data frame to the evolved nodeB at the preferred time and frequency.

In an embodiment of the present disclosure, the present disclosure relates to a method for transmitting data from a plurality of telemetry devices to an evolved nodeB by a telemetry aggregator over wireless communication network, comprising: receiving, by a telemetry aggregator, plurality of data frames from one of the plurality of the telemetry devices; aggregating, by the telemetry aggregator, the plurality of data frames to generate an aggregated data frame; communicating, by the telemetry aggregator, a preferred time and frequency to the evolved nodeB for transmitting the aggregated data frame to the evolved nodeB; and transmitting, by the telemetry aggregator, the aggregated data frame to the evolved nodeB at the preferred time and frequency.

In an embodiment, the present disclosure relates to a system for transmitting data from a plurality of telemetry devices to an evolved nodeB by a telemetry aggregator over wireless communication network, comprising: a plurality of telemetry devices; an evolved nodeB; and a telemetry aggregator in communication with the plurality of telemetry devices and the evolved nodeB, the telemetry aggregator is configured to: receive a plurality of data frames from one of the plurality of the telemetry devices; aggregate the plurality of data frames to generate an aggregated data frame; communicate a preferred time and frequency to the evolved nodeB for transmitting the aggregated data frame to the evolved nodeB; and transmit the aggregated data frame to the evolved nodeB at the preferred time and frequency.

Those skilled in the art will appreciate that the conception upon which this disclosure is based may readily be utilized as a basis for the designing of other structures for carrying out the several purposes of the disclosure. It is important therefore that the claims be regarded as including such equivalent constructions as do not depart from the scope of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and when read in conjunction with the accompanying drawings. One or more embodiments are characteristics of the disclosure are set forth in the appended claims. The embodiments of the disclosure itself, however, as well as a preferred mode of use, further objectives, and advantages thereof, will best be understood by reference to the following detailed description of an illustrative embodiment now described, by way of example only, with reference to the accompanying drawings in which:

Figure 1:
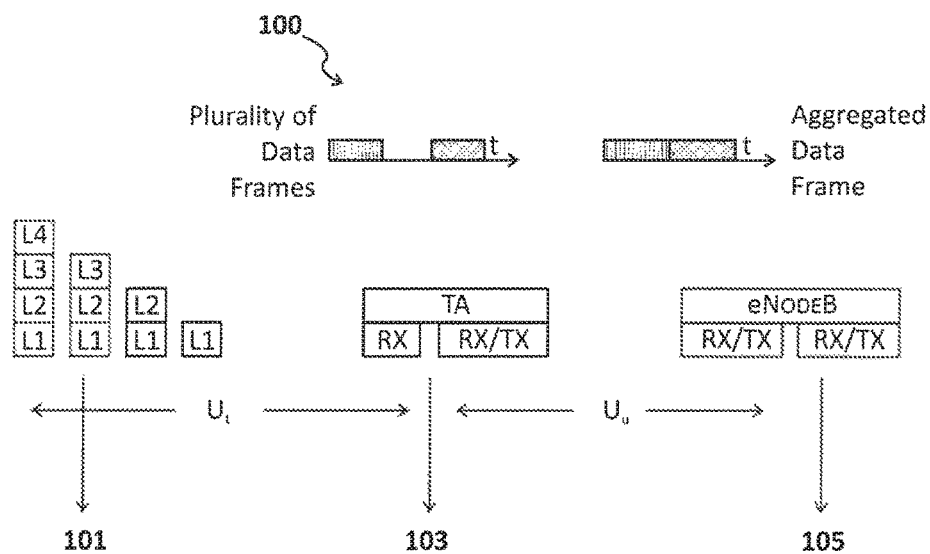
FIG. 1 illustrates exemplary environment for transmitting data from a plurality of telemetry devices to an evolved nodeB over wireless communication network in accordance with another embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or telemetry aggregator.

The present disclosure relates to a method, telemetry aggregator and system for transmitting data from a plurality of telemetry devices to an evolved nodeB over wireless communication network. The present disclosure provides a telemetry aggregator (TA) which is in communication with plurality of telemetry devices and an evolved nodeB. The TA receives a plurality of data frames from one of the plurality of telemetry devices and aggregates the plurality of data frames into an aggregated data frame. The TA then transmits the aggregated data frame to the eNodeB. Thus, low power telemetry devices are able to transmit the data frames to the evolved node B for a longer time.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates exemplary environment for enabling low power telemetry devices for transmitting data over a communication network in accordance with some embodiments of the present disclosure.

As shown in FIG. 1 the environment 100 comprises a telemetry device (TD) 101, a telemetry aggregator (TA) 103 and an Evolved Node B (eNodeB) 105 in the communication network. As an example, the communication network may be Long-Term Evolution (LTE), Code division multiple access (CDMA) etc., broadband provider switching such as carrier Ethernet, broadband provider routing network such as Internet Protocol (IP) network, broadband cross-connect network such as Synchronous Digital Hierarchy (SDH), broadband light-path network such as Coarse Wavelength Division Multiplexing (CWDM). It is to be noted here that the environment 100 comprises of plurality of telemetry devices (TDs) in the communication network. For the sake of clarity and simplicity, only one TD is shown here in FIG. 1.

As illustrated in FIG. 1, the TA 103 is placed at a distance "$U_t$" from TD 101 and is placed at a distance "$U_u$" from the eNodeB 105. The TD 101 comprises a transmitter for transmitting plurality of data frames also referred as T-data or data to the TA 103. In an embodiment, the TD 101 transmits data with sufficient power such that the power does not drain for a very long time, e.g. 1 month, 1 year, 5 years, 10 years The battery power depends on the capacity of one or more button-cells or batteries placed in TD 101 and also the frequency of transmission and application for which the TD 101 is used. For example, electricity meter reading is transmitted once a month for billing purpose. However, electricity rationing meter reading may be sent daily to optimize the distribution and consumption of electricity from the grid. In a non-limiting embodiment, the plurality of data frames may be layer 1 (L1), layer 2 (L2), layer 3 (L3) data frames etc. The plurality of data frames may be encrypted by the TD 101 before transmitting them to the TA 103.

Figure 2:
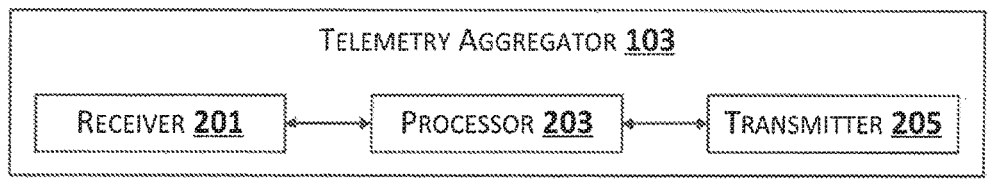
FIG. 2 illustrates exemplary block diagram of a telemetry aggregator for transmitting data from a plurality of telemetry devices to an evolved nodeB over wireless communication network in accordance with an embodiment of the present disclosure.

FIG. 2 illustrates exemplary block diagram of a telemetry aggregator for transmitting data from a plurality of telemetry devices to an evolved nodeB over wireless communication network.

As shown in FIG. 2, the telemetry aggregator 103 comprises of a receiver 201, a processor 203 and a transmitter 205 in communication with each other. The receiver 201 is configured to receive the plurality of data frames transmitted by the TD. Upon receiving the plurality of data frames, the processor 203 aggregates and assembles the plurality of data frames. Aggregation refers to collecting all the received packets and assembling refers to creation of an aggregated data frame or a jumbo frame with proper header fields and payloads. In an embodiment of the present disclosure, the TA compresses the aggregated data frame before sending it to the eNodeB. In another embodiment of the present disclosure, the aggregated frame sent from the TA is in a format which is compatible with the eNodeB.

Figure 3:
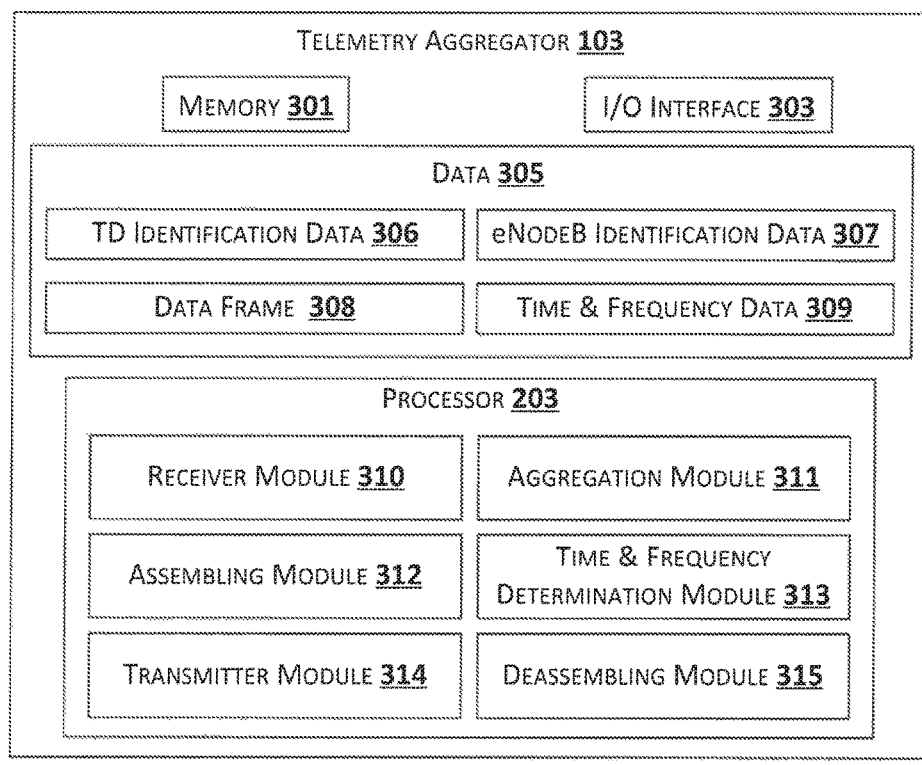
FIG. 3 illustrates exemplary detailed diagram of the telemetry aggregator of FIG. 2 in accordance with an embodiment of the present disclosure.

The TA 103 may be a typical TA as illustrated in FIG. 3. The TA 103 may include at least one Central Processing Unit ("CPU" or "processor") 203 and a memory 301 storing instructions executable by the at least one processor 203. The processor 203 may comprise at least one data processor for executing program components for executing user or system-generated requests. The memory 301 is communicatively coupled to the processor 203. The TA 103 further comprises an Input/Output (I/O) interface 303. The I/O interface 303 is coupled with the processor 203 through which an input signal or/and an output signal is communicated.

The TA 103 further comprises data 305 and the processor 203 further comprises various modules. In one implementation, the data 305 may be stored within the memory 301. In one example, the data 305 may include TD identification data 306, eNodeB identification data 307, data frame 308 and time and frequency data 309. In one embodiment, the data 305 may be stored in the memory 301 in the form of various data structures. Additionally, the aforementioned data can be organized using data models, such as relational or hierarchical data models.

In an embodiment, TD identification data 306 comprises identification information for identifying telemetry device from which the frames are being received. The eNodeB identification data 307 comp-rises information for identifying the enodeB 105 to which aggregate frame is to be transmitted. The data frame 308 comprises information of plurality of data frames like header information, layer for the data frame etc. The time and frequency data 309 comprises the preferred time and frequency which is used to transmit the data to enodeB 105.

In an embodiment, the data 305 in the memory 301 is processed by modules of the telemetry aggregator 103. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 209 when configured with the functionality defined in the present disclosure will result in a novel hardware.

The processor 203 may include various modules, for example, a receiver module 310, an aggregation module 311, an assembling module 312, a time and frequency determination module 313, a transmitter module 314, a disassembling module 315. The processor 203 may also comprise other modules to perform various miscellaneous functionalities of the TA 103. It will be appreciated that such aforementioned modules may be represented as a single module or a combination of different modules. The various modules mentioned above may be implemented in the form of software, hardware and/or firmware.

The receiver module 301 receives the plurality of data frame from the receiver 201. The aggregation module 303 aggregates the plurality of data frame and the assembling module 305 assembles the plurality of data frames into an aggregated data frame after aggregation. In an embodiment, the disassembling module 303 also disassembles the plurality of data frames received from the eNodeB 105. The transmitter module 309 transmits the aggregated data frame to the transmitter 205.

The transmitter 205 transmits the aggregated data frame to the eNodeB 105. In an embodiment, the TA 103 communicates preferred time and frequency to be contacted to the eNodeB 105 in order to transmit the aggregated frame after aggregation and frame assembling. In an exemplary embodiment, preferred time may be the time when network load is minimum, and preferred frequency may be the frequency that has low atmospheric loss or Rayleigh fading or the frequency supported by the RF architecture of the TA 103 in the uplink and downlink. The preferred time and frequency is determined by the time and frequency determination module 307. Transmitting the aggregated data frame at a preferred time avoids the possibility of collision and interference with the plurality of data frames sent by the TD 101. In an embodiment, when the TD 101 wants to transmit data to the TA 103, the TA 103 should not be transmitting data to eNodeB 105. If both TD 101 and TA 103 transmit frames simultaneously, then there will be collision of signal over the air and frame from the TD 101 will never reach TA 103. Also, power of the TA 103 is more than that of the TD 101 so as to reach eNodeB that is far away. The eNodeB 105 understands from the request of the preferred time from the TA 103 that the eNodeB 105 must create a signal null in all the other times. This ensures minimum interference for reception of the plurality of data frames at the TA 103 during all other times which is not the preferred time. In one embodiment, the TD 101 cannot be scheduled as they have only one transmitter and therefore TA 103 cannot schedule or instruct the TD 101 to transmit at specific time and frequency. Therefore, TA 103 ensure that downlink signal from eNodeB 105 does not corrupt the TD 101 uplink data received at the TA 103 by explicitly communicating preferred time and frequency to the eNodeB 105. After communicating the preferred time and frequency, the TA 103 transmits the aggregated data frame at the preferred time and frequency.

In an embodiment, the signal power from the eNodeB may reach the TA 103 with good quality and signal power from the TA 103 can reach the eNodeB 105 with good quality.

Figure 4:
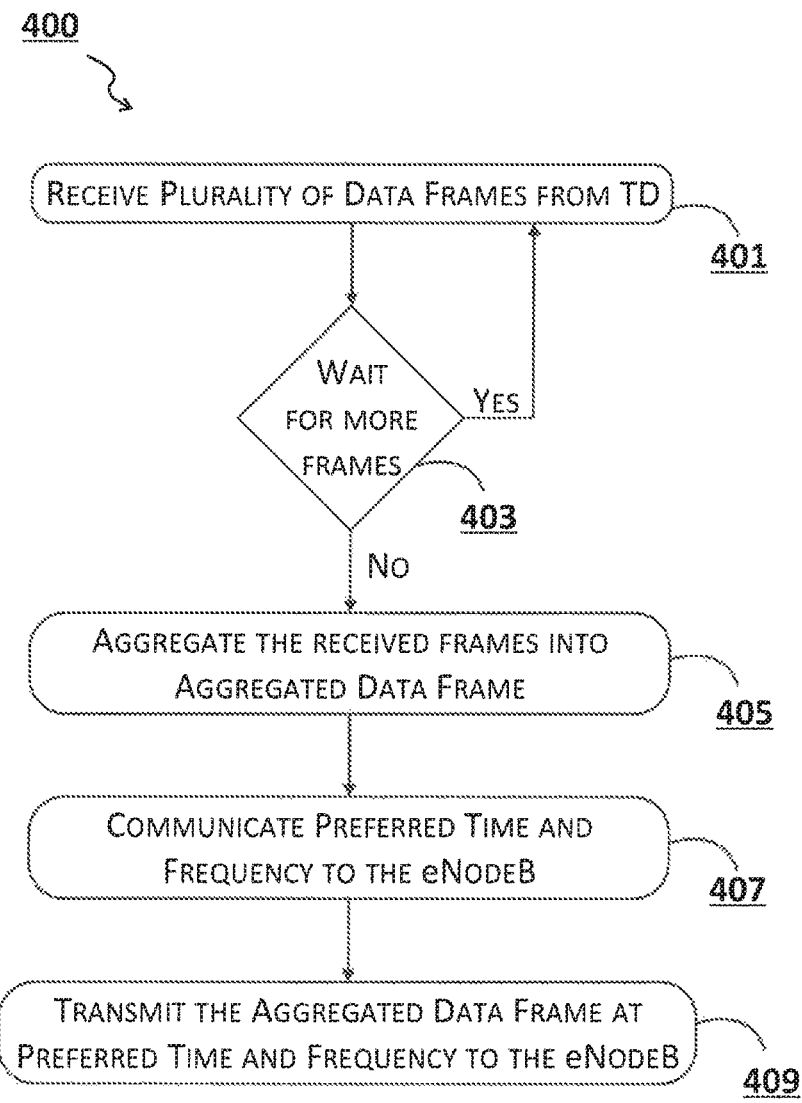
FIG. 4 shows flowchart illustrating a method for transmitting data from a plurality of telemetry devices to an evolved nodeB over wireless communication network in accordance with another embodiments of the present disclosure.

FIG. 4 shows flowchart illustrating a method for transmitting data from a plurality of telemetry devices to an evolved nodeB over wireless communication network in accordance with some embodiments of the present disclosure.

As illustrated in FIG. 4, the method 400 may comprise one or more steps for transmitting data from a plurality of telemetry devices to an evolved nodeB over wireless communication network, in accordance with some embodiments of the present disclosure. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the TA 103 receives plurality of data frames from the TD 101. In an embodiment, the plurality of data frames may be layer 1, layer 2, layer 3 data frames.

At block 403, the TA 103 waits for more frames from the TD 101. If there are more frames still being transmitted from the TD 101, then the method proceeds to block 401 via "YES". If there are no more frames being transmitted from the TD 101, then the method proceeds to block 405 via "No".

At block 405, the TA 103 aggregates and assembles the frames into an aggregate data frame.

At block 407, the TA 103 communicates the preferred time and frequency to be contacted to the eNodeB 105 so that the eNodeB 105 communicates with the TA 103 only at the preferred time and frequency in order to avoid the interference for the reception of the telemetry data from the TD 101.

At block 409, the TA 103 transmits the aggregated data frame to the eNodeB 105 at the preferred time and frequency.

Since the eNodeB 105 receives the aggregated data frame, the processing is much easier and there is no necessity for connecting with the IoT devices for processing control messages and the T-data received at the eNodeB 105.

Computer System

Figure 5:
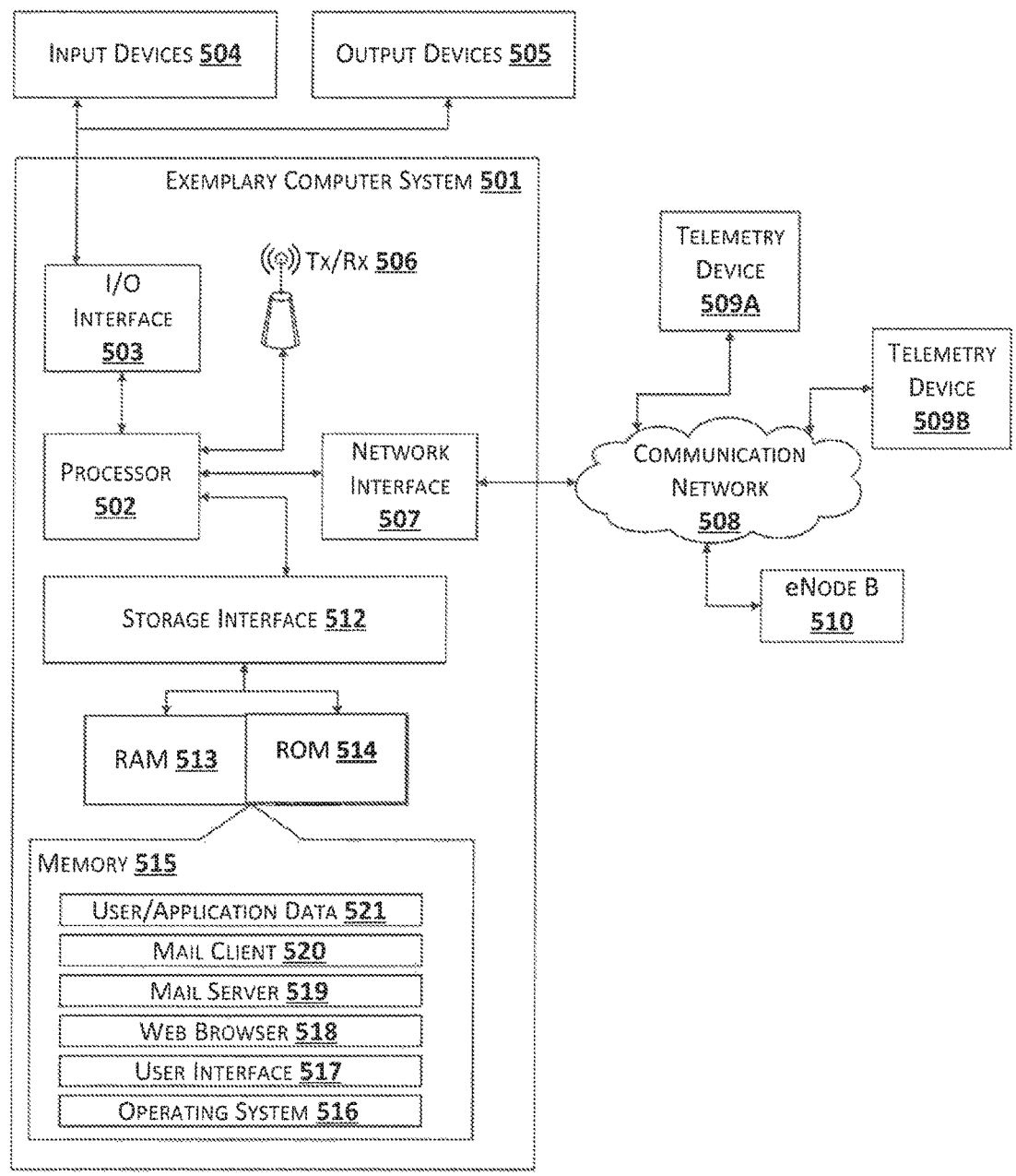
FIG. 5 illustrates exemplary block diagram of an exemplary computer system for implementing embodiments consistent with the present disclosure.

FIG. 5 illustrates a block diagram of an exemplary computer system 501 for implementing embodiments consistent with the present disclosure. In an embodiment, the computer system 501 is used to implement the method for adaptive streaming of multimedia data. The computer system 501 may comprise a central processing unit ("CPU" or "processor") 502. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 505 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 501 is connected to the service operator through a communication network 508. The processor 502 may be disposed in communication with the communication network 508 via a network interface 507. The network interface 507 may communicate with the communication network 508. The network interface 507 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 508 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 507 and the communication network 508, the computer system 501 may communicate with plurality of telemetry devices 509A . . . , 509B, and an eNodeB 510.

In some embodiments, the processor 502 may be disposed in communication with a memory 515 via a storage interface 512. The storage interface 512 may connect to memory 515 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 515 may store a collection of program or database components, including, without limitation, an operating system 516, user interface 517, web browser 518 etc. In some embodiments, computer system 501 may store user/application data 521, such as the data, variables, records, etc. as described in this disclosure. Such databases may be implemented as fault-tolerant, relational, scalable, secure databases such as Oracle or Sybase.

The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 501 may implement a web browser 518 stored program component. The web browser 518 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 518 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 501 may implement a mail client stored program component. The mail client may be a mail viewing application, such as Apple Mail, Microsoft Entourage, Microsoft Outlook, Mozilla Thunderbird, etc.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The present disclosure enables low power telemetry devices to transmit data over a communication network.

The present disclosure discloses the TA which aggregates and assembles the plurality of data frames received from one of the plurality of Telemetry Devices (TD) into an aggregated data frame and transmits the aggregated data frame to the eNodeB. This ensures that eNodeB need not be connected to IoT devices for processing the control messages received at eNodeB, since the TA sends a single frame to the eNodeB and hence the processing is easier.

The present disclosure provides feature wherein the TA is connected with the plurality of TD because of which even the low power TD devices may transmit data over the mobile network. This is because the TA is close to the power source. Therefore, there is no necessity for the low power TD to be close to the power source always while transmitting the data.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 101 | Telemetry Device (TD) |
| 103 | Telemetry Aggregator (TA) |
| 105 | eNodeB |
| 200 | Telemetry Aggregator (TA) |
| 201 | Receiver of TA |
| 203 | Processor of TA |
| 205 | Transmitter of TA |
| 300 | Telemetry Aggregator (TA) |
| 301 | Memory of TA |
| 303 | I/O interface of TA |
| 305 | Data stored in TA |
| 400 | Flow chart |
| 501 | Computer system |
| 502 | Processor |
| 503 | I/O Interface |
| 506 | Transceiver |
| 507 | Network interface |
| 508 | Communication Network |
| 509A . . . 509B | Plurality of TD |
| 510 | eNodeB |
| 512 | Storage Interface |
| 513 | RAM |
| 514 | ROM |
| 515 | Memory |

We claim:

1. A telemetry aggregator for transmitting data from a plurality of telemetry devices to an evolved nodeB over a wireless communication network, the telemetry aggregator comprising:
a processor coupled to the receiver and configured to:
receive a plurality of data frames from the plurality of telemetry devices, wherein each of the telemetry devices are configured to: automatically measure and wirelessly transmit the measurement data from a remote source in the wireless communication network;
aggregate the plurality of data frames to generate an aggregated data frame;
communicate a preferred time and a preferred frequency to the evolved nodeB for transmitting the aggregated data frame to the evolved nodeB at the preferred time and at the preferred frequency; and
transmit the aggregated data frame to the evolved nodeB at the preferred time and at the preferred frequency.

2. The telemetry aggregator as claimed in claim 1, wherein the aggregated data frame is appended with a corresponding header and payload.

3. The telemetry aggregator as claimed in claim 1, wherein the processor is further configured to: transmit the aggregated data frame in a format compatible with the evolved nodeB.

4. The telemetry aggregator as claimed in claim 1, wherein the processor is further configured to: compress the aggregated data frame before transmitting to the evolved nodeB.

5. The method as claimed in claim 1, further comprising: compressing, by the processor, the aggregated data frame before transmitting to the evolved nodeB.

6. The telemetry aggregator as claimed in claim 1, wherein the preferred time is a time when network load is low.

7. The telemetry aggregator as claimed in claim 1, wherein the preferred frequency is a frequency that has a low atmospheric loss or Rayleigh fading or a frequency supported by an RF architecture of the TA in an uplink and downlink.

8. The telemetry aggregator as claimed in claim 1, wherein
the preferred time is a time when network load is low, and
the preferred frequency is a frequency that has a low atmospheric loss or Rayleigh fading or a frequency supported by an RF architecture of the TA in an uplink and downlink.

9. A method for transmitting data from a plurality of telemetry devices to an evolved nodeB by a telemetry aggregator over a wireless communication network, comprising:
receiving, by a processor, a plurality of data frames from the plurality of the telemetry devices, wherein each of the telemetry devices are configured to: automatically measure and wirelessly transmit the measurement data from a remote source in the wireless communication network;
aggregating, by the processor, the plurality of data frames to generate an aggregated data frame;
communicating, by the processor, a preferred time and a preferred frequency to the evolved nodeB for transmitting the aggregated data frame to the evolved nodeB at the preferred time and preferred frequency; and
transmitting, by the telemetry aggregator, the aggregated data frame to the evolved nodeB at the preferred time and at the preferred frequency.

10. The method as claimed in claim 9, wherein the aggregated data frame is appended with a corresponding header and payload.

11. The method as claimed in claim 9, further comprising: transmitting, by the processor, the aggregated data frame in a format compatible with the evolved nodeB.

12. A system for transmitting data from a plurality of telemetry devices to an evolved nodeB by a telemetry aggregator over a wireless communication network, comprising:
a plurality of telemetry devices;
an evolved nodeB; and
a telemetry aggregator in communication with the plurality of telemetry devices and the evolved nodeB, wherein the telemetry aggregator is configured to:
receive a plurality of data frames from the plurality of the telemetry devices, wherein each of the telemetry devices are configured to: automatically measure and wirelessly transmit the measurement data from a remote source in the wireless communication network;
aggregate the plurality of data frames to generate an aggregated data frame;
communicate a preferred time and a preferred frequency to the evolved nodeB for transmitting the aggregated data frame to the evolved nodeB at the preferred time and at the preferred frequency; and
transmit the aggregated data frame to the evolved nodeB at the preferred time and at the preferred frequency.

* * * * *